United States Patent Office.

JOHN HALLIDAY, OF LYNN, MASSACHUSETTS.

Letters Patent No. 99,885, dated February 15, 1870.

IMPROVED COLORING MATTER TO BE USED IN VULCANIZED RUBBER.

The Schedule referred to in these Letters Patent and making part of the same.

*To all whom it may concern:*

Be it known that I, JOHN HALLIDAY, of Lynn, in the State of Massachusetts, have invented a new Coloring Matter, as a Substitute for Vermilion in the Production of Colored Vulcanized India Rubber, or Allied Gums; and I do hereby declare that the following is a full, clear, and exact description thereof.

The object of my invention is to produce a coloring matter to be used as a substitute for vermilion in the preparation of vulcanite of a suitable color for dental plates, as vermilion, which is a sulphuret of mercury, is believed by many persons to be deleterious.

The said coloring matter I prepare in the following manner:

I take five pounds of garancine, such as used by calico printers, and boil it in three gallons of water for about two hours, using for that purpose a copper or porcelain vessel. After boiling that length of time, strain the liquor through a fine cloth, and, after filtration, let it settle for about twelve hours, and carefully draw off the clear liquor from the sediment. Boil one pound of cochineal in one gallon of pure water during one hour, and then filter through a fine seive or filtering cloth.

The two liquors so prepared are then mixed in the proportion of five parts by measure of the garancine liquor, to one part of the cochineal liquor. To each gallon of this compound liquor, I add two pounds of pure oxide of antimony, and heat it until the water is all evaporated, leaving the new coloring matter in a suitable condition to be mixed with India rubber or allied gum and sulphur, in the same manner as vermilion has heretofore been used.

And although I prefer to use oxide of antimony, the oxide of other metals may be substituted. The proportions above given may be varied without materially varying the result.

The boiling point is the best temperature to be used in working the process, although a higher temperature may be employed.

What I claim as my invention, and desire to secure by Letters Patent, is—

The coloring matter, substantially such as described, for coloring India rubber or allied gum, and consisting of the oxide of antimony, or equivalent metallic oxide, which has been treated with garancine and cochineal, substantially as herein-above described.

JNO. HALLIDAY.

Witnesses:
ANDREW J. DELACY.
WM. H. BISHOP.